United States Patent [19]

Emelock

[11] Patent Number: 4,597,363
[45] Date of Patent: Jul. 1, 1986

[54] HYDROGEN GENERATOR FOR MOTOR VEHICLE

[76] Inventor: Melvin Emelock, 1748 NW. 72nd Ave., Plantation, Fla. 33313

[21] Appl. No.: 472,987

[22] Filed: Apr. 20, 1983

Related U.S. Application Data

[62] Division of Ser. No. 238,934, Feb. 27, 1981, Pat. No. 4,376,097.

[51] Int. Cl.$^4$ .............................................. F02B 43/08
[52] U.S. Cl. ................................. 123/3; 123/DIG. 12; 123/1 A; 422/189; 429/17
[58] Field of Search .................. 123/1 A, 3, DIG. 12; 429/17; 48/61, 197 R, 197 A; 422/189; 290/17; 180/65 B

[56] References Cited

U.S. PATENT DOCUMENTS

| | | | |
|---|---|---|---|
| 583,104 | 5/1897 | Wattles | 123/1 R X |
| 1,790,635 | 1/1931 | Arendt | 290/17 |
| 4,018,190 | 4/1977 | Henault | 123/DIG. 12 |
| 4,119,862 | 10/1978 | Gocho | 180/65 B X |

Primary Examiner—E. Rollins Cross
Attorney, Agent, or Firm—Joseph Zallen

[57] ABSTRACT

Oxalic acid, dispersed in glycerol is heated to form formic acid which is then heated at a higher temperature to form hydrogen. By-product carbon dioxide is absorbed. The hydrogen is used directly with a fuel cell to produce electricity or as fuel for an internal combustion engine.

2 Claims, 2 Drawing Figures

HYDROGEN GENERATOR FOR MOTOR VEHICLE

This is a division of application Ser. No. 238,934 filed Feb. 27, 1981 now U.S. Pat. No. 4,376,097.

BACKGROUND OF INVENTION

This invention relates to hydrogen generators. In particular it relates to hydrogen generators which are such size and weight as to be suitable for use in motor vehicles and the like.

As early as 1897 it was proposed to generate hydrogen as a fuel for an engine by reacting zinc or iron with sulphuric acid (U.S. Pat. No. 583,104). It has also been hitherto proposed to have an electric motor vehicle wherein an internal combustion engine drives a generator which in turn maintains the charge on the batteries for the electric motor vehicle (U.S. Pat. Nos. 1,970,634, 1,790,635, 3,517,766 and 4,119,862.) An electric vehicle has also been described in which an internal combustion drives an electric generator which in turn directly drives electric motors (U.S. Pat. No. 3,107,304). It has also been proposed to provide an internal combustion engine incorporated with a hydrogen generator wherein alcohol such as methanol is decomposed at a temperature of 200° to 400° C. in the presence of a catalyst such as zinc oxide-copper oxide. For a variety of reasons none of the prior art hydrogen generators are commercially feasible for motor vehicles.

One object of the present invention is to provide a novel hydrogen generator which is feasible for use in a motor vehicle.

Other objects and advantages of this invention will be apparent from the description and claims which follow taken together with the appended drawings.

SUMMARY OF INVENTION

The hydrogen generator of the present invention utilizes a solid fuel, namely oxalic acid. The oxalic acid preferably in a liquid medium such as glycerol, is heated to form formic acid gas which in turn is heated to form hydrogen.

The reaction of heating oxalic acid forms carbon dioxide as a by-product and the heating of the formic acid gas also forms carbon dioxide as a by-product. Accordingly, one feature of this invention is to separate the carbon dioxide gas from the hydrogen gas as for example, by absorption in an alkaline solution such as calcium hydroxide.

The invention comprises broadly heating a mixture of oxalic acid and glycerol at a temperature of approximately 120° C., whereby formic acid and carbon dioxide are formed, heating the formic acid to a temperature of approximately 160° C. whereby hydrogen gas and carbon dioxide are formed, and conducting the hydrogen to either an internal combustion engine or a fuel cell. Where the hydrogen is conducted to an internal combustion engine it is preferred that the engine be stationary and constantly running so as to operate an electrical generator to maintain the charge in the battery. Where the hydrogen is conducted to a fuel cell it is contemplated that the current produced is fed directly to storage batteries, there preferably being a plurality of fuel cells to obtain the required voltage.

In one embodiment of this invention replacable cartridges of oxalic acid are placed in a chamber where circulating glycerol conducts the mixture to the first reaction chamber where the temperature is about 120° C. The formic acid formed in the first reaction chamber is then conducted to the second reaction chamber where at a temperature of 160° C. the hydrogen is formed. The first reaction chamber preferably has a heat-resistant gas permeable membrane so that the gases can escape without affecting the recirculation of the glycerol solution. The carbon dioxide is preferably separated from the hydrogen by absorption as for example, in a chamber of calcium hydroxide solution to form a precipitate of calcium carbonate.

The fuel cell that is preferred for use with this invention is one where the hydrogen does not have to be pure and where air could be used instead of pure oxygen. Carbon electrodes can be used because of the durability and a platinum type catalyst can be used to catalyze the reaction.

Heating of the reaction chambers can be done by the use of thermostatically-controlled electrical heating units within the walls of the reaction chambers. Alternately where an internal combustion engine is used the heat from the exhaust of the engine can be used to accomplish the chemical reactions. A vacuum pump is preferred to insure the removal of the gases from the second reaction chamber.

A preferred use of the invention is in connection with an electric vehicle powered by storage batteries. The oxalic acid fuel provides the energy for additional recharging of the batteries and thus can be operated on a steady basis on a vehicle.

The construction of the device is illustrated schematically.

It is well within the scope of the chemical engineering art of today to select the appropriate materials, sizes and shapes of the materials of construction, sizes, arrangement and shapes of the various chambers and other components of the invention.

SPECIFIC EXAMPLES OF INVENTION

Figure 1:
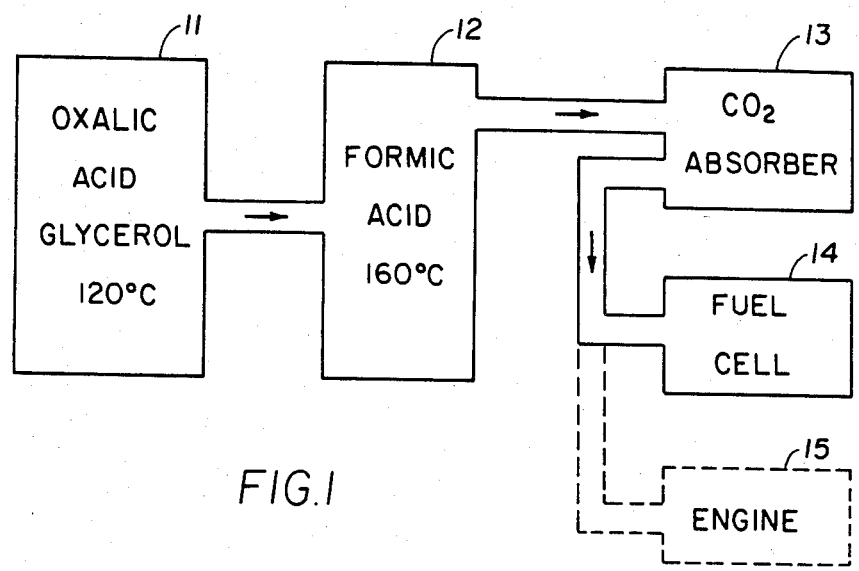
FIG. 1 is a schematic diagram of the invention.
Figure 2:
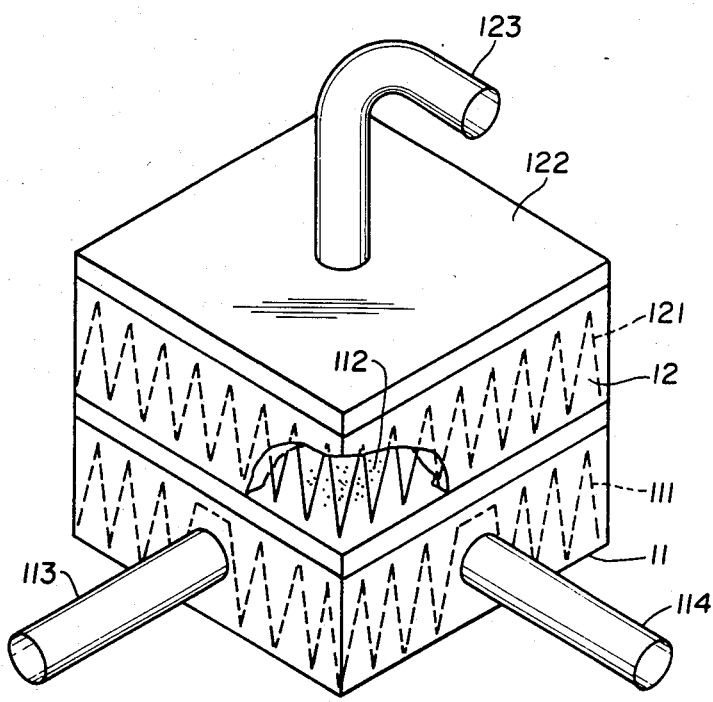
FIG. 2 is a schematic diagram of a hydrogen generator made in accordance with this invention.

Referring to the drawings, the oxalic acid dispersed in glycerol heated to 120° C. yields formic acid and carbon dioxide. The formic acid which is gaseous in form when now heated to 160° C. forms hydrogen gas and carbon dioxide. The carbon dioxide from both stages is absorbed and the hydrogen gas fed to either a fuel cell or an engine.

Oxalic acid dispersed in glycerol is placed in enclosed chamber 11 which has all solid walls except for the top wall 112 which is a gas-permeable, inert, heat-resistant membrane, as for example, fiberglass or ceramic. The walls of chamber 11 contain thermostatically controlled electric heaters which maintain the temperature of chamber 11 at approximately 120° C. Conduits 113 and 114 permit a continuous flow of oxalic acid and glycerol into chamber 11 from a source not illustrated.

As the oxalic acid decomposes into formic acid gas, the gas passes through membrane wall 112 to the second chamber 12 where thermostatically controlled electric heaters in its walls maintain the temperature of chamber 12 at approximately 160° C. The formic acid decomposes to form hydrogen gas. The hydrogen is passed through carbon dioxide absorber 13 and then fed to either a fuel cell 14 or as fuel to internal combustion engine 15.

The gases exit chamber 12 through exit conduit 123, to which a vacuum may be applied. The carbon dioxide absorber 13 may contain a slurry of calcium hydroxide. Although not illustrated it is contemplated that the recirculating glycerol, will be bringing in fresh oxalic acid in chamber 11 to replace the oxalic acid consumed, so that this is a controllable reaction. The hydrogen produced can be fed to fuel cells of various construction, but preferable those that do not require high purity as for example, a fuel cell utilizing aqueous sulphuric acid with carbon electrodes and a platinum-type catalyst.

I claim:

1. A method for generating electricity in situ comprising heating a dispersion of oxalic acid in liquid medium at about 120° C. to form formic acid, heating said formic acid at a temperature of about 160° C. to form hydrogen, and conducting said hydrogen to a fuel cell whereby electrical energy is formed or as fuel to an internal combustion engine.

2. The method of claim 1 wherein the liquid is glycerol.

* * * * *